United States Patent
Ivanov et al.

(10) Patent No.: US 12,154,291 B2
(45) Date of Patent: Nov. 26, 2024

(54) METHOD AND APPARATUS FOR IMPROVING LOCALIZATION OF A DEVICE

(71) Applicant: HERE GLOBAL B.V., Eindhoven (NL)

(72) Inventors: Pavel Ivanov, Tampere (FI); Henri Jaakko Julius Nurminen, Tampere (FI); Lauri Aarne Johannes Wirola, Tampere (FI); Marko Luomi, Lempäälä (FI)

(73) Assignee: HERE GLOBAL B.V., Eindhoven (NL)

( * ) Notice: Subject to any disclaimer, the term of this patent is extended or adjusted under 35 U.S.C. 154(b) by 373 days.

(21) Appl. No.: 17/552,737

(22) Filed: Dec. 16, 2021

(65) Prior Publication Data

US 2023/0196608 A1 Jun. 22, 2023

(51) Int. Cl.
  *G06T 7/73* (2017.01)
  *G06V 10/44* (2022.01)
  *G06V 10/74* (2022.01)

(52) U.S. Cl.
  CPC .............. *G06T 7/73* (2017.01); *G06V 10/44* (2022.01); *G06V 10/761* (2022.01)

(58) Field of Classification Search
  CPC ......... G06T 7/73; G06V 10/761; G06V 10/44
  See application file for complete search history.

(56) References Cited

U.S. PATENT DOCUMENTS

| | | | | |
|---|---|---|---|---|
| 8,442,304 B2 * | 5/2013 | Marrion | ............... | G06V 20/653 |
| | | | | 382/294 |
| 8,897,541 B2 * | 11/2014 | Weisenburger | ........... | G06T 7/73 |
| | | | | 382/113 |

(Continued)

FOREIGN PATENT DOCUMENTS

| | | | | |
|---|---|---|---|---|
| WO | WO-2010077524 A1 * | 7/2010 | ......... | G06K 9/00214 |
| WO | WO 2018/104563 A2 | 6/2018 | | |

(Continued)

OTHER PUBLICATIONS

Wang et al., "DeLS-3D: Deep Localization and Segmentation with a 3D Semantic Map", 2018 IEEE/CVF Conference on Computer Vision and Pattern Recognition (CVPR), arXiv: 1805.04949v1, (May 13, 2018), 10 pages.

(Continued)

*Primary Examiner* — Shefali D Goradia
(74) *Attorney, Agent, or Firm* — Jason Wejnert; HERE GLOBAL B. V.

(57) ABSTRACT

A method, apparatus and computer program product are provided for improving localization of a device. In order to improve the localization, a coarse location of the device is determined and a feature is identified in an image captured by an image capture unit associated with the device. The feature is represented with one or more points or lines within an image plane and a projection is determined of the one or more points or lines from the image plane to a ground plane. At one or more location points defined relative to the coarse location of the device, map data is compared to the projection of the one or more points or lines representative of the feature identified in the image. Based on the comparison, a refined location of the device is determined.

16 Claims, 5 Drawing Sheets

(56) References Cited

U.S. PATENT DOCUMENTS

| | | | |
|---|---|---|---|
| 9,582,720 B2 | 2/2017 | Gupta et al. | |
| 10,024,668 B2 | 7/2018 | Takeuchi et al. | |
| 11,810,323 B2* | 11/2023 | Goto | G06T 1/00 |
| 2009/0140887 A1* | 6/2009 | Breed | G01C 21/1656 |
| | | | 701/116 |
| 2017/0116723 A1* | 4/2017 | Aughey | B64U 20/87 |
| 2020/0098135 A1* | 3/2020 | Ganjineh | G06F 16/587 |
| 2020/0300637 A1 | 9/2020 | Chiu et al. | |
| 2022/0398775 A1* | 12/2022 | Streem | G06T 17/05 |
| 2023/0316563 A1* | 10/2023 | Greenspan | G06T 7/50 |
| | | | 382/103 |

FOREIGN PATENT DOCUMENTS

| | | | |
|---|---|---|---|
| WO | WO 2020/224305 A1 | 11/2020 | |
| WO | WO-2022261381 A9 * | 11/2023 | G06F 16/55 |

OTHER PUBLICATIONS

"Camera Calibration", OpenCV (Open Source Computer Vision), OpenCV—Python Tutorials; Camera Calibration and 3D Reconstruction, [Retrieved via the Internet: <URL: https://docs.opencv.org/4.x/dc/dbb/tutorial_py_calibration.html>, 4 pages.

* cited by examiner

METHOD AND APPARATUS FOR IMPROVING LOCALIZATION OF A DEVICE

TECHNOLOGICAL FIELD

An example embodiment relates generally to a method, apparatus and computer program product for improving localization of a device and, more particularly, to a method, apparatus and computer program product for determining a refined location of a device based upon a comparison of a projection, such as a perspective projection or a central projection, of a representation of a feature identified from an image and map data.

BACKGROUND

The localization of a device, such as a mobile telephone, a navigation system or the like, is relevant for a number of applications. In this regard, a number of applications are dependent upon the location of a device in order to provide services or information to the device or others. Examples of these applications include navigation and mapping applications, as well as various social media applications that publish the locations of various devices. As such, the accuracy and the precision with which the location of a device can be reliably identified is of importance to these applications.

In some situations, the location of a device may be difficult to reliably determine, at least with the reliability and the precision that is desired for certain applications. For example, in an urban environment, such as within an urban canyon, it may be challenging to reliably determine the location of a device with sufficient precision. This challenge may be exacerbated in instances in which the device is closely proximate to a building, such as in an instance in which a person carrying a mobile telephone is standing next to a building in an urban environment. In instances in which the location of a device is difficult to reliably determine in a precise manner, a more general location of the device may be determined. For example, the location of a device in an urban environment may be determined to be near an intersection, but it may be difficult to determine the particular street corner of the intersection at which the device is located. Similarly, a device in an urban environment may be determined to be located within a particular block or within a portion of a block, but it may be difficult to identify the side of the street on which the device is located.

The difficulties associated with the more precise localization of a device including, for example, the reliable determination of the side of the street on which a device is located or the street corner on which the device is located, may cause challenges in conjunction with or otherwise limit the utilization of certain applications. For example, ride-sharing applications utilized by ride share services are at least partially dependent upon the precise determination of the location of the device via which a request for the ride-sharing service is submitted. In this regard, the determination as to the side of the street or the street corner on which the device is located is of importance as the side of the street or the street corner will at least partially define the route taken by the ride-share vehicle in order to pick up the person carrying the device, as well as the location at which the ride-share vehicle will come to a halt in order to pick up the person. By way of another example, indoor navigation applications at least partially rely upon the location at which a device enters a building or other structure in order to provide detailed maps and/or navigational instructions throughout the building. As a result, the location at which the device enters the building or other structure should be determined with precision in order to accurately present interior maps and/or navigation instructions once the device enters the building or other structure. However, the challenges associated with determining the location of a device with precision in certain environments, such as in an urban setting, may prevent the location of the device from being reliably determined with the desired precision and, as a result, cause the indoor navigational application to correspondingly perform with less precision than is desired.

BRIEF SUMMARY

A method, apparatus and computer program product are provided in accordance with an example embodiment in order to improve the localization of a device, such as by improving the precision with which the location of a device is determined. By improving the localization of the device including in an instance in which the device is within an urban environment, such as an urban canyon, the method, apparatus and computer program product provide a refined location that allows applications dependent upon the location of the device to perform more accurately and reliably. Additionally, the improved localization of the device provided by the method, apparatus and computer program product of an example embodiment may also be utilized for other purposes including to improve or update radio maps, such as Wi-Fi or other types of radio maps. The method, apparatus and computer program product of an example embodiment are configured to improve the localization of a device in an efficient manner, such as being reliant upon a single or small number of images and requiring only a limited amount of map data, such as two-dimensional map data.

In an example embodiment, a method is provided for improving localization of a device. The method includes determining, with processing circuitry, a coarse location of the device and identifying a feature in an image captured by an image capture unit associated with the device. The method also includes representing the feature with one or more points or lines within an image plane and determining a projection of the one or more points or lines from the image plane to a ground plane. At one or more location points defined relative to the coarse location of the device, the method further includes comparing map data to the projection of the one or more points or lines representative of the feature identified in the image. Based on the comparing, the method additionally includes determining a refined location of the device.

The method of an example embodiment also includes determining an orientation of a local coordinate frame of the device in relation to a global coordinate frame upon capturing the image. In this example embodiment in which the map data is defined in the global coordinate frame, the method may also include converting one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature. In regards to the conversion, the method of this example embodiment may convert one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the projection. The method of this example embodiment may also compare map data to the projection by determining a similarity between the map data and the projection of the one or more points or lines representative of the feature following conversion to the common coordinate frame, such as by determining the similarity based upon a distance between the one or more points or lines of the projection representative of the feature and one or more points or lines as defined by the map data.

The map data that is compared to the projection of the one or more points or lines representative of the feature may define a two-dimensional model. In this example embodiment, the feature may include one of a building, an element of the building, a road or an attribute of the road and the two-dimensional model defined by the map data may include a two-dimensional representation of at least one of the building or the road. The method of this example embodiment may also compare map data to the projection by comparing the one or more points or lines of the projection that are representative of the feature to the two-dimensional model defined by the map data.

The method of an example embodiment also includes determining the ground plane based upon a gravity vector acting upon the device and an altitude of the device upon capturing the image. In an example embodiment, the method determines the refined location by determining a side of a street or a street corner on which the device is located.

In another example embodiment, an apparatus is provided that is configured to improve localization of a device. The apparatus includes processing circuitry and at least one non-transitory memory including computer program code instructions stored therein with the computer program code instructions configured to, when executed by the processing circuitry, cause the apparatus at least to determine a coarse location of the device. The computer program code instructions are also configured to, when executed by the processing circuitry, cause the apparatus to identify a feature in an image captured by an image capture unit associated with the device and to represent the feature with one or more points or lines within an image plane. The computer program code instructions are further configured to, when executed by the processing circuitry, cause the apparatus to determine a projection of the one or more points or lines from the image plane to a ground plane and, at one or more location points defined relative to the coarse location of the device, to compare map data to the projection of the one or more points or lines representative of the feature identified in the image. The computer program code instructions are additionally configured to, when executed by the processing circuitry, cause the apparatus to determine a refined location of the device based on the comparison of the map data to the projection.

The computer program code instructions are further configured to, when executed by the processing circuitry, cause the apparatus of an example embodiment to determine an orientation of a local coordinate frame of the device in relation to a global coordinate frame upon capturing the image. In this example embodiment in which the map data is defined in the global coordinate frame, the computer program code instructions are further configured to, when executed by the processing circuitry, cause the apparatus to convert one of the map data or the projection of the one or more points or lines representative of the feature from its respective coordinate frame to the common coordinate frame of the other one of the map data or the projection of the one or more points or lines representative of the feature, prior to comparing the map data to the projection of the one or more points or lines representative of the feature. The computer program code instructions may be configured to, when executed by the processing circuitry, cause the apparatus of this example embodiment to convert one of the map data or the projection by converting one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the projection. In this example embodiment, the computer program code instructions are configured to, when executed by the processing circuitry, cause the apparatus to compare map data to the projection by determining a similarity between the map data and the projection of the one or more points or lines representative of the feature following conversion to the common coordinate frame, such as by determining the similarity based upon a distance between the one or more points or lines of the projection representative of the feature and one or more points or lines as defined by the map data.

The map data that is compared in one example embodiment to the projection of the one or more points or lines representative of the feature defines a two-dimensional model. In an example embodiment, the feature includes one of a building, an element of the building, a road or an attribute of the road and the two-dimensional model defined by the map data may include a two-dimensional representation of at least one of the building or the road. The computer program code instructions may be configured to, when executed by the processing circuitry, cause the apparatus of this example embodiment to compare the map data and the projection by comparing the one or more points or lines of the projection that are representative of the feature to the two-dimensional model defined by the map data.

The computer program code instructions are further configured to, when executed by the processing circuitry, cause the apparatus of an example embodiment to determine the ground plane based upon a gravity vector acting upon the device and an altitude of the device upon capturing the image. In an example embodiment, the computer program code instructions are further configured to, when executed by the processing circuitry, cause the apparatus of an example embodiment to determine the refined location by determining a side of a street or a street corner on which the device is located.

In a further example embodiment, a computer program product is provided that is configured to improve localization of a device. The computer program product includes at least one non-transitory computer-readable storage medium having computer-executable program code instructions stored therein with the computer-executable program code instructions including program code instructions configured to determine a coarse location of the device. The computer-executable program code instructions also include program code instructions configured to identify a feature in an image captured by an image capture unit associated with the device and program code instructions configured to represent the feature with one or more points or lines within an image plane. The computer-executable program code instructions further include program code instructions configured to determine a projection of the one or more points or lines from the image plane to a ground plane and, at one or more location points defined relative to the coarse location of the device, to compare map data to the projection of the one or more points or lines representative of the feature identified in the image. The computer-executable program code instructions additionally include program code instructions configured to determine a refined location of the device based on the comparison of the map data to the projection.

The computer-executable program code instructions of an example embodiment also include program code instructions configured to determine an orientation of a local coordinate frame of the device in relation to a global coordinate frame upon capturing the image. In this example embodiment in which the map data is defined in the global coordinate frame, the computer-executable program code instructions may also include program code instructions configured to convert one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature. In regards to the conversion, the computer-executable program code instructions of this example embodiment may include program code instructions configured to convert one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the projection. In an example embodiment, the program code instructions configured to compare map data to the projection may include program code instructions configured to determine a similarity between the map data and the projection of the one or more points or lines representative of the feature following conversion to the common coordinate frame, such as by determining the similarity based upon a distance between the one or more points or lines of the projection representative of the feature and one or more points or lines as defined by the map data.

The map data that is compared to the projection of the one or more points or lines representative of the feature may define a two-dimensional model. In this example embodiment, the feature may include one of a building, an element of the building, a road or an attribute of the road and the two-dimensional model defined by the map data may include a two-dimensional representation of at least one of the building or the road. In this example embodiment, the program code instructions configured to compare map data to the projection may include program code instructions configured to compare the one or more points or lines of the projection that are representative of the feature to the two-dimensional model defined by the map data.

The computer-executable program code instructions of an example embodiment may also include program code instructions configured to determine the ground plane based upon a gravity vector acting upon the device and an altitude of the device upon capturing the image. In an example embodiment, the program code instructions configured to determine the refined location include program code instructions configured to determine a side of a street or a street corner on which the device is located.

In yet another example embodiment, an apparatus is provided for improving localization of a device. The apparatus includes means for determining a coarse location of the device and means for identifying a feature in an image captured by an image capture unit associated with the device. The apparatus also includes means for representing the feature with one or more points or lines within an image plane and means for determining a projection of the one or more points or lines from the image plane to a ground plane. At one or more location points defined relative to the coarse location of the device, the apparatus further includes means for comparing map data to the projection of the one or more points or lines representative of the feature identified in the image. Based on the comparing, the apparatus additionally includes means for determining a refined location of the device.

The apparatus of an example embodiment also includes means for determining an orientation of a local coordinate frame of the device in relation to a global coordinate frame upon capturing the image. In this example embodiment in which the map data is defined in the global coordinate frame, the apparatus may also include means for converting one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature. In regards to the conversion, the apparatus of this example embodiment may include means for converting one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the projection. In this example embodiment, the means for comparing map data to the projection may include means for determining a similarity between the map data and the projection of the one or more points or lines representative of the feature following conversion to the common coordinate frame, such as by including means for determining the similarity based upon a distance between the one or more points or lines of the projection representative of the feature and one or more points or lines as defined by the map data.

The map data that is compared to the projection of the one or more points or lines representative of the feature may define a two-dimensional model. In this example embodiment, the feature may include one of a building, an element of the building, a road or an attribute of the road and the two-dimensional model defined by the map data may include a two-dimensional representation of at least one of the building or the road. In this example embodiment, the means for comparing map data to the projection may include means for comparing the one or more points or lines of the projection that are representative of the feature to the two-dimensional model defined by the map data.

The apparatus of an example embodiment also includes means for determining the ground plane based upon a gravity vector acting upon the device and an altitude of the device upon capturing the image. In an example embodiment, the means for determining the refined location may include means for determining a side of a street or a street corner on which the device is located.

BRIEF DESCRIPTION OF THE DRAWINGS

Figure 1:
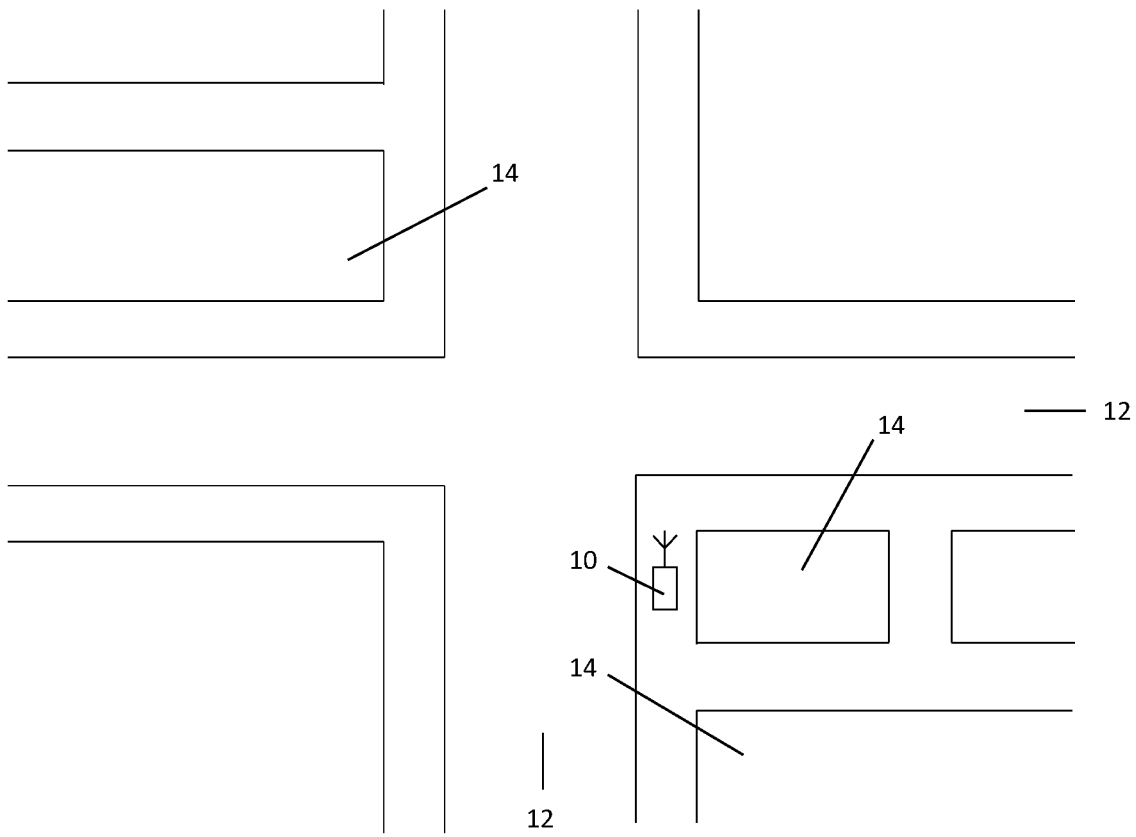
Figure 2:
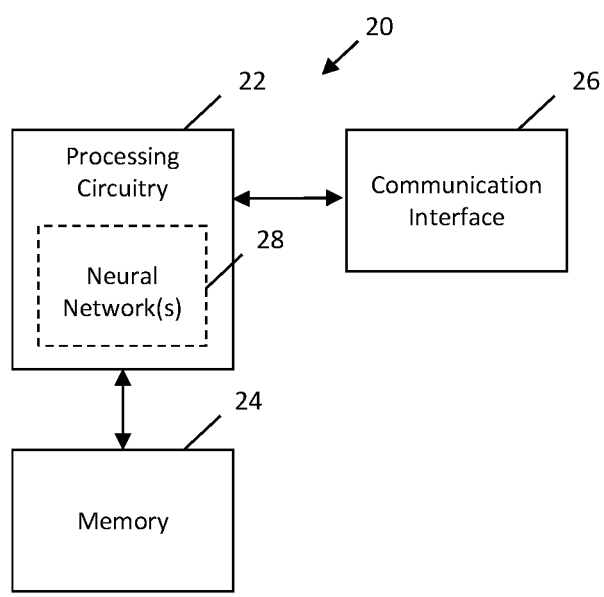
Figure 3:
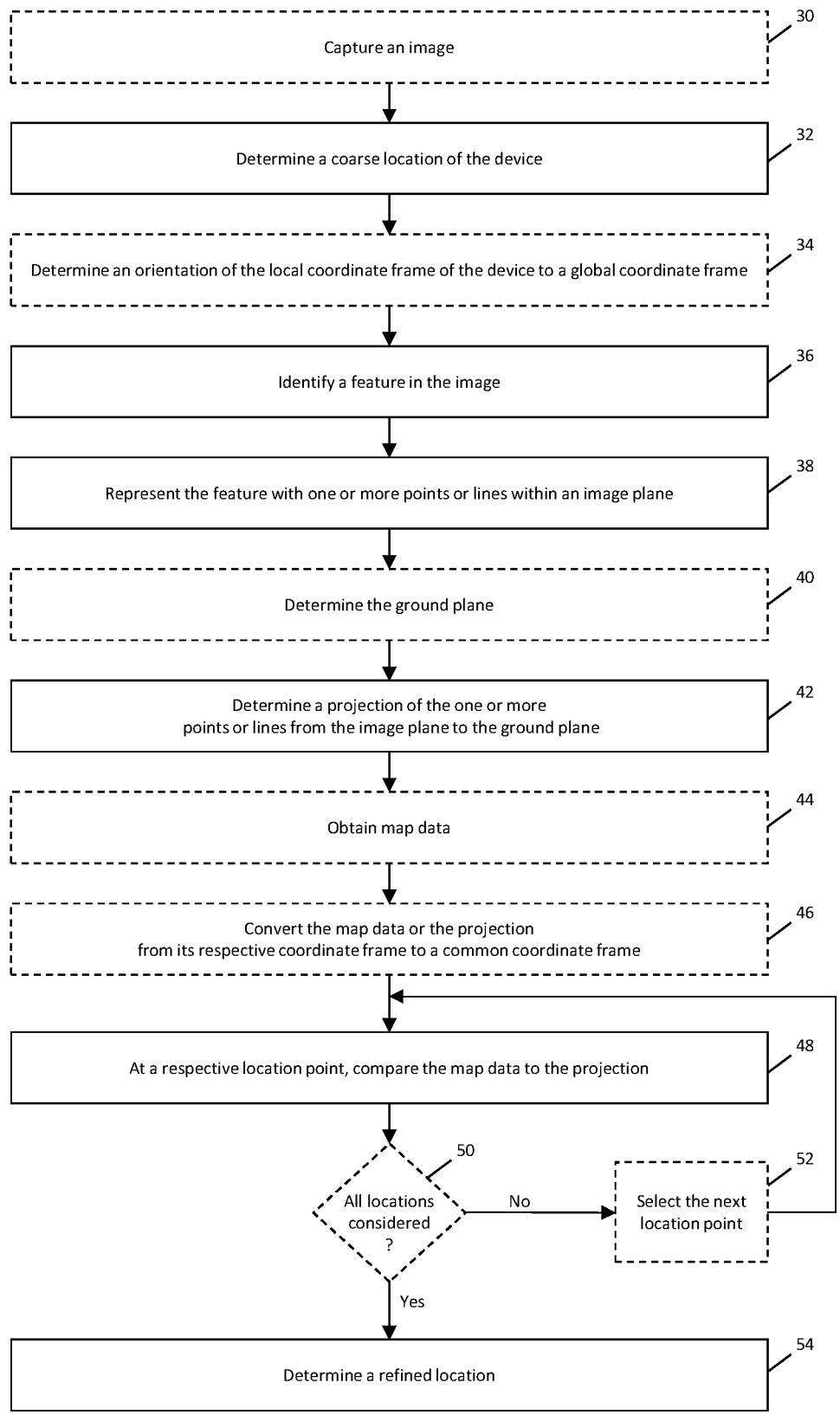
Figure 4A:
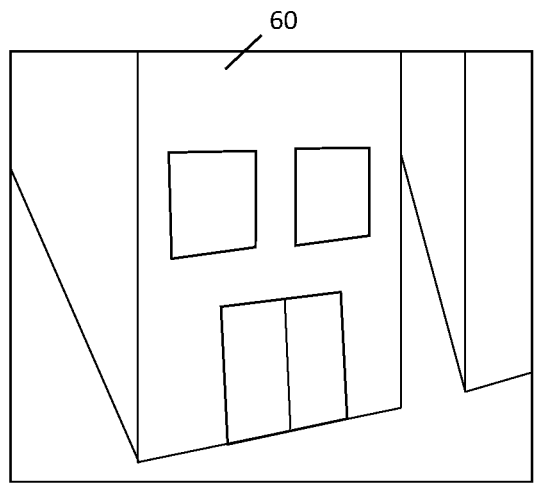
Figure 4C:
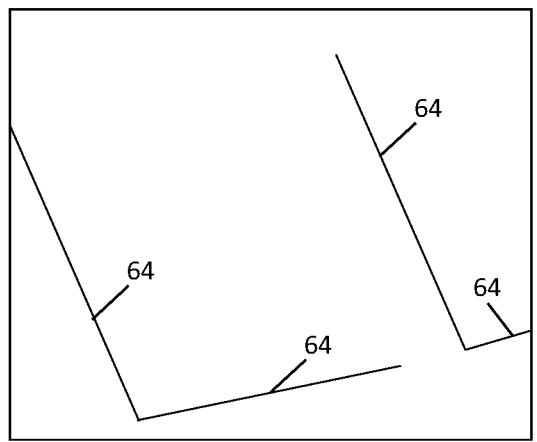
Figure 4B:
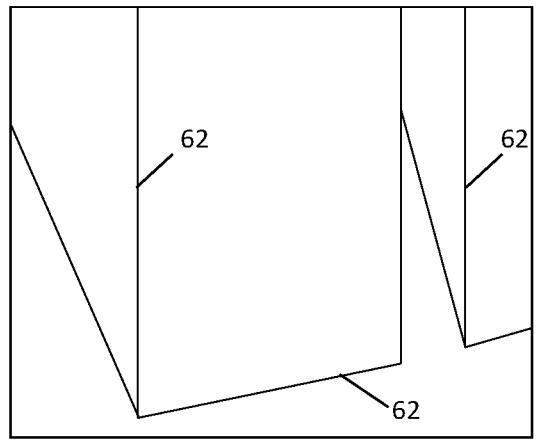
Figure 4D:
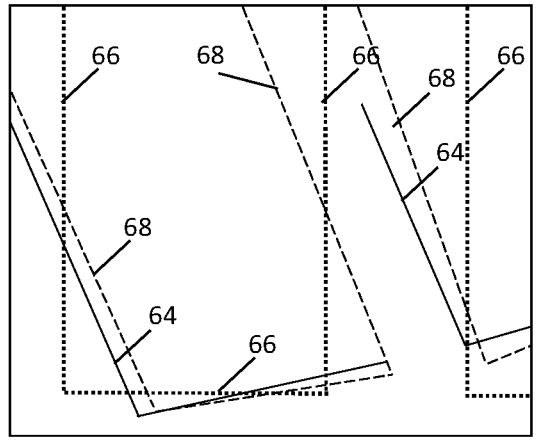
Figure 5:
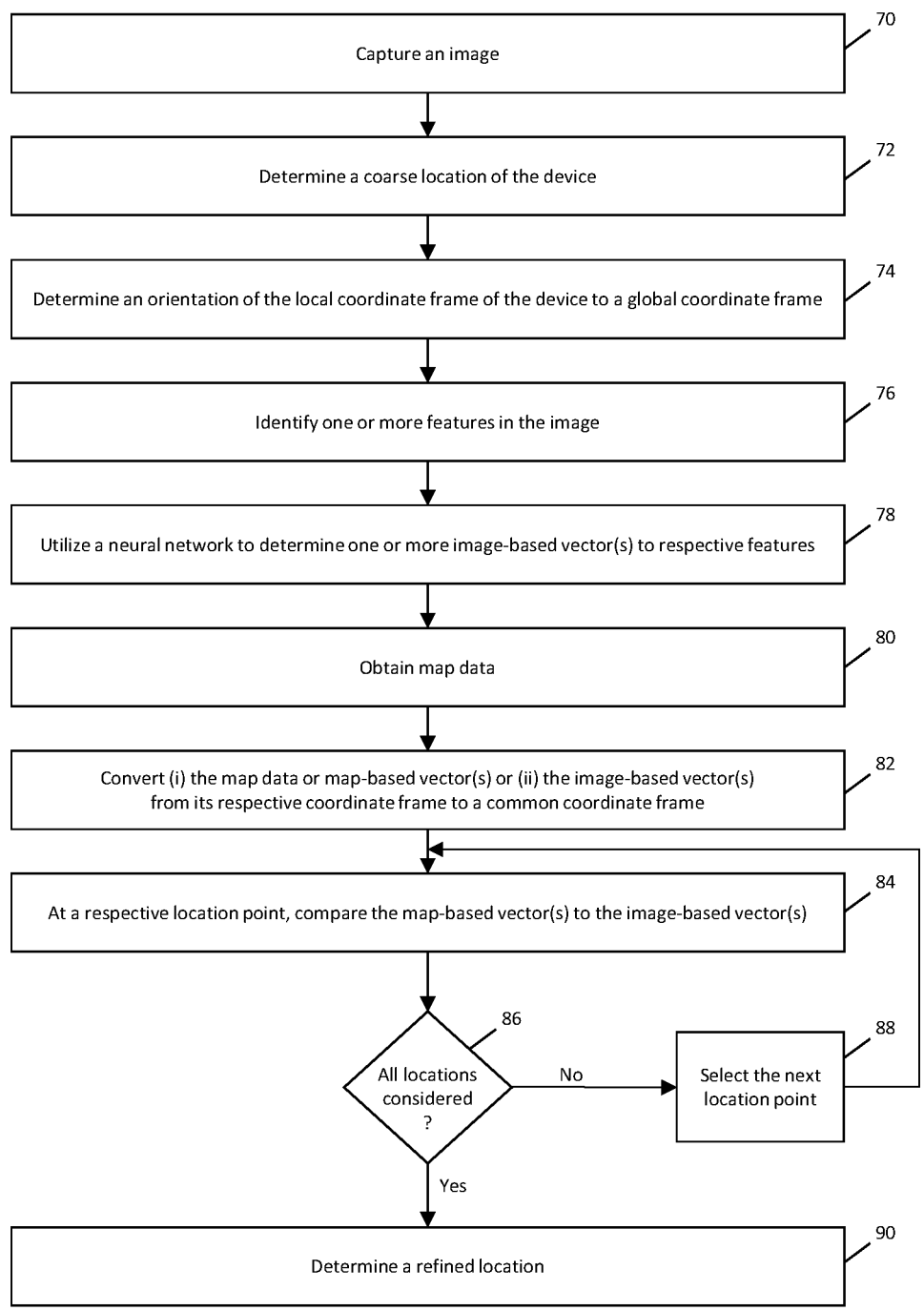
Figure 6A:
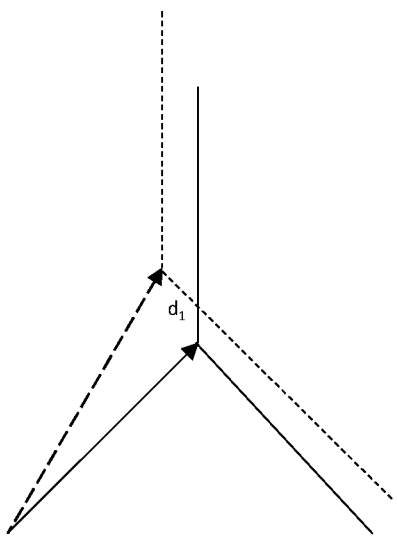
Figure 6B:
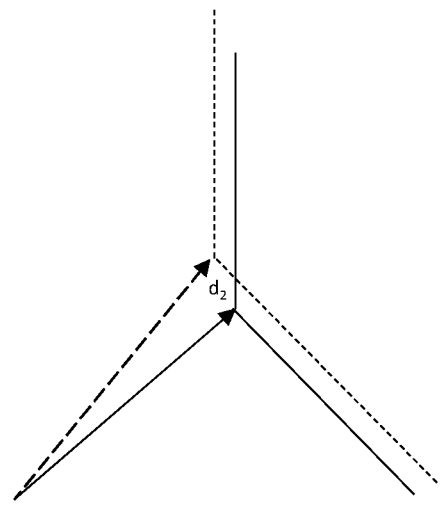
Figure 7:
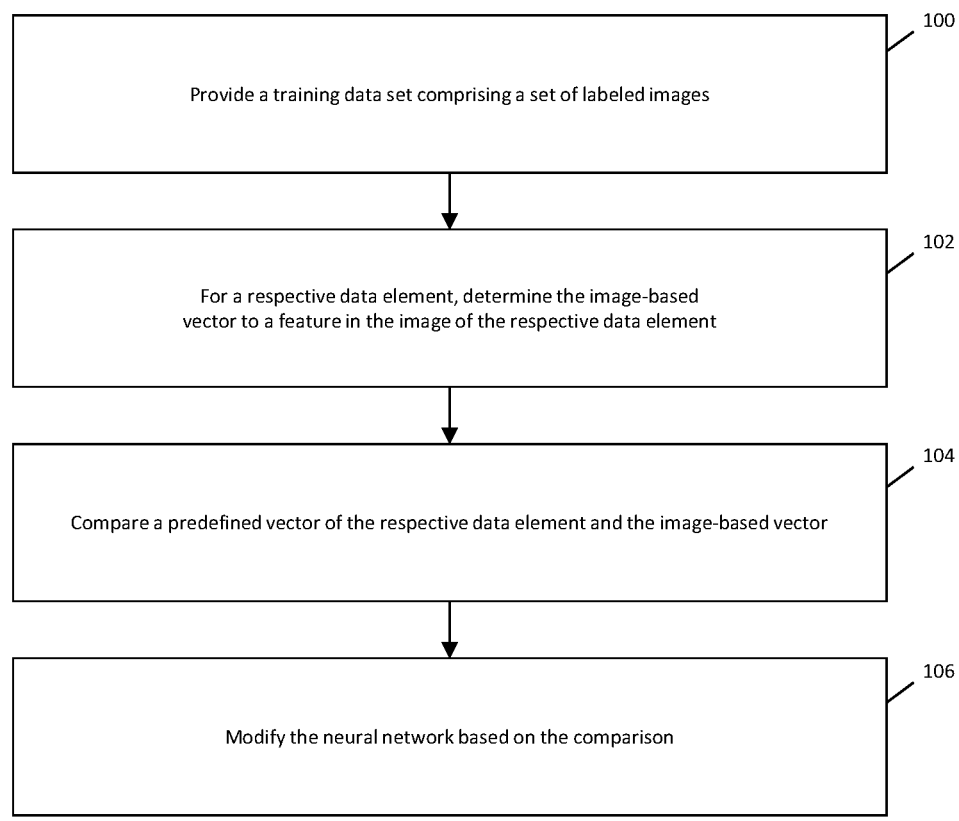

Having thus described example embodiments of the present disclosure in general terms, reference will now be made to the accompanying drawings, which are not necessarily drawn to scale, and wherein:

FIG. 1 depicts a mobile device within an urban environment;

FIG. 2 is a block diagram of an apparatus that may be specifically configured in accordance with an example embodiment;

FIG. 3 is a flow chart illustrating the operations performed, such as by the apparatus of FIG. 2, in order to improve the localization of a device;

FIG. 4A is an image of a building;

FIG. 4B is a representation of the building of FIG. 4A with a plurality of lines;

FIG. 4C is a perspective projection of the lines representative of the building of FIG. 4B;

FIG. 4D illustrates a comparison of the perspective projection of FIG. 4C to map data representative of the corresponding building from two different location points in the vicinity of a coarse location of the device in accordance with an example embodiment of the present disclosure;

FIG. 5 is a flow chart illustrating the operations performed, such as by the apparatus of FIG. 2, in order to improve the localization of a device utilizing a neural network in accordance with another example embodiment of the present disclosure;

FIGS. 6A and 6B represent the comparison of an image-based vector determined by a neural network to two different map-based vectors extending from respective location points to a feature identified within an image in accordance with an example embodiment of the present disclosure; and FIG. 7 is a flow chart illustrating the operations performed, such as by the apparatus of FIG. 2, in order to train the neural network to generate image-based vectors to respective features in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to improve the localization of a device. The location of a variety of different types of devices may be determined by the method, apparatus and computer program product, such as variety of mobile devices including, for example, a personal digital assistant (PDA), mobile telephone, smart phone, personal navigation device, smart watch, tablet computer, or any combination of the aforementioned and other types of portable computer devices, or a positioning or navigation system such as a positioning or navigation system onboard a vehicle, e.g., an automobile, a truck, a drone, a train, etc.

The method, apparatus and computer program product of an example embodiment may be configured to reliably determine the location of a device with increased precision while the device is located in a variety of different environments. By way of example, but not of limitation, a method, apparatus and computer program product may be configured to improve the localization of a device in an urban environment, such as within an urban canyon, as shown in FIG. 1. In this regard, a mobile device 10, such as a mobile telephone, is depicted to be located on a sidewalk near an intersection of two streets 12. A plurality of buildings 14 are positioned along each of the streets in the example urban environment of FIG. 1. As shown, the device is also positioned proximate one of the buildings. As a result, the determination of the location of the device utilizing satellite signals, e.g., Global Positioning System (GPS) signals, received from the Global Navigation Satellite System (GNSS) and/or Wi-Fi or other radio signals not be sufficiently reliable and precise for at least certain applications. Thus, the location of a device that is determined utilizing GNSS and/or Wi-Fi signals provide a coordinate which may fall within the street, on sidewalk as shown in FIG. 1 or even within a building, and GNSS may not be capable of determining the type of location at which the device is indicated to be located. As such, the urban environment may prevent the location of the device from being precisely defined utilizing GNSS and/or Wi-Fi signals such that it may be difficult to reliably determine the side of the street or the corner of the intersection on which the device is located. However, the method, apparatus and computer program product of an example embodiment are configured to improve the localization of the device, even in such urban environment, such that the side of the street or the street corner on which the device is located may be determined in a precise and reliable manner.

The apparatus 20 of an example embodiment as depicted in FIG. 2 may be embodied by any of a variety of computing devices. For example, the apparatus may be embodied by the device 10, such as a mobile device, for which the location is being determined with increased precision. Alternatively, the apparatus may be embodied by a network-based device, such as a server, a cloud computing device, a computer workstation, a distributed network of computing devices, a personal computer, a positioning or navigation system or any other type of computing device that is configured to communicate with a plurality of devices, e.g., mobile devices, including, for example, the device for which the location is to be determined with increased precision. Regardless of the manner in which the apparatus is embodied, the apparatus of an example embodiment is in communication with processing circuitry 22 and a memory device 24 and optionally a communication interface 26, such as in an instance in which the apparatus is embodied by a network-based computing device.

In some embodiments, the processing circuitry 22 (and/or co-processors or any other processors assisting or otherwise associated with the processing circuitry) can be in communication with the memory device 24 via a bus for passing information among components of the apparatus 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 3, the operations performed, such as by the apparatus 20 of FIG. 2, in accordance with an example embodiment in order to improve the localization of a device 10 are depicted. As shown in block 30 of FIG. 3, an image of the environment in which the device is located is captured. For example, the device, such as a mobile telephone, may include an image capture unit, such as a camera, such that the image of the environment in which the device is located is captured by the device, such as the camera of the device. As such, in an embodiment in which the apparatus is embodied by the device for which the location is to be determined within increased precision, the apparatus may additionally include an image capture unit, such as a camera, configured to capture the image of the environment in which the device is located. Alternatively, the image may be captured by an image capture unit that is distinct from, but associated with the device for which the location is to be determined with increased precision, such as by being co-located with the device for which the location is to be determined. In an instance in which the device is carried by a person or a vehicle, for example, the same person or vehicle may also carry an image capture unit, such as a camera, configured to capture the image of the environment in which the device is located. In any event, the image that is captured of the environment in which the device is located is provided to the apparatus for subsequent analysis as described below. With reference to FIG. 1, for example, the image that is captured of the environment in which the device is located may include an image of the building 14 to which the device is proximate.

The apparatus 20 also includes means, such as the processing circuitry 22, the communication interface 26 or the like, for determining a coarse location of the device 10. See block 32. The coarse location of the device is an estimate of the location of the device that will be refined in the manner described below so as to provide for improved localization relative to that provided by the coarse location. The coarse location may be determined in various manners. For example, the apparatus may include or be in communication with a GPS or other location sensor including, for example, a receiver such as a GNSS receiver for receiving GNSS signals from which the coarse location of the device may be determined. Additionally, or alternatively, the apparatus may include or be in communication with a Wi-Fi or other radio sensor and, as such, may include a receiver configured to receive Wi-Fi signals. The coarse location of the device may be determined based upon the Wi-Fi or other radio signals, such are based upon the comparison of the Wi-Fi signals to a Wi-Fi radio map identifying the anticipated Wi-Fi signals to be received at each of a plurality of different locations.

The device 10 defines a local coordinate frame. For example, the local coordinate frame may define the local X, Y and Z axes of the device. With respect to a mobile telephone, for example, the X and Y axes may lie in the plane defined by the body of the mobile telephone with the X-axis extending in the longer dimension of the device, e.g., from top to bottom, along the centerline of the device, while the Y-axis extends in the shorter dimension of the device, e.g., from side to side, along the centerline of the mobile telephone. The Z-axis of this example telephone extends perpendicularly to the plane defined by the body of the device. By way of another example, the X, Y and Z axes may be defined to intersect at the camera center point, particularly in an embodiment in which the device is detached from the camera or other image capture unit. As the local coordinate frame of the device is defined by the device, the local coordinate frame can vary in relation to the global coordinate frame defined by the earth, such as defined by the gravity vector and the direction toward true north.

In an embodiment in which the image is captured by the device 10, such as by a camera of the device or by an image capture unit that is co-located with and is commonly oriented with the device, the apparatus 20 includes means, such as the processing circuitry 22, one or more sensors, a communication interface 26 or the like, for determining the orientation of the local coordinate frame of the device in relation to the global coordinate frame upon capturing the image, that is, at the time at which the image is captured. See block 34 of FIG. 3. The orientation of the local coordinate frame of the device in relation to the global coordinate frame may be determined in various manners. In an example embodiment, however, the device may include or be associated with one or more sensors, such as one or more magnetometers, one or more accelerometers and/or one or more gyroscopes, that provide information regarding the orientation of the gravity vector relative to the device and the direction of true north relative to the device, such that the apparatus, such as the processing circuitry, is configured to determine the orientation of the local coordinate frame of the device with respect to the global coordinate frame.

Referring now to block 36, the apparatus 20 includes means, such as the processing circuitry 22 or the like, for identifying one or more features in the image. See block 36. The apparatus, such as the processing circuitry, may be configured to identify the feature in various manners. In one example embodiment, however, the apparatus, such as the processing circuitry, is configured to implement a computer vision technique that is configured to detect a particular type of feature, thereby identifying not only a feature but also the type of feature. In this regard, the apparatus, such as the processing circuitry, may be configured to identify any of the plurality of different types of features including by way of example but not of limitation one or more of a building, an element of the building such as a corner of a building, the center of a front wall of a building, the junction between the wall of the building and the ground plane, a road, or an attribute of the road, such as an edge of the road, the center line of the road, lane markings of the road, etc. In relation to the detection of a road, for example, the computer vision technique implemented by the apparatus, such as the processing circuitry, may be configured to detect the edges of a road, the center line of the road, the lane markings along the road, etc. With respect to a building, a computer vision technique implemented by the apparatus, such as the processing circuitry, may be configured to identify the edges of the building, such as the edges of the walls and the roof of the building.

As shown in block 38 of FIG. 3, the apparatus 20 of an example embodiment also includes means, such as the processing circuitry 22 or the like, for representing the feature with one or more points or lines within an image plane. The image plane is defined in the local coordinate frame of the device and is the plane in which the image sensors are disposed. For a road that is detected within the image, the apparatus, such as the processing circuitry, may be configured to represent the road with one or more lines representative of the edges of the road, the center line of the road and/or one or more lanes of the road. With respect to a building, the apparatus, such as the processing circuitry, may be configured to represent the building with lines indicative of the footprint of the building, the corners of the building, the outline of the roof of the building or the like. By way of example, FIG. 4A illustrates an image including a building 60 that is identified by computer vision as a feature within the image. As shown in FIG. 4B, the building is represented by a plurality of lines 62 that define that portion of the footprint of the building and the corners of the building, such as defined by the intersection of two or more exterior walls of the building, that are visible in the image. Although FIG. 4B depicts a representation of the building with a plurality of lines within the image plane defined by the image capture unit, such as a camera, the feature may alternatively or additionally be represented by one or more points within the image plane, such as points representative of the corners of the building or the like.

Referring now to block 40 of FIG. 3, the apparatus 20 includes means, such as the processing circuitry 22, one or more sensors, the communication interface 26 or the like, for determining the ground plane, also in the local coordinate frame of the device 10. In an example embodiment, the apparatus, such as the processing circuitry, is configured to determine the ground plane based on a gravity vector acting upon the device and an altitude of the device upon capturing the image, that is, at the time of capturing the image. As such, the apparatus may include or be in communication with, such as via the communication interface, with a sensor, such as a magnetometer, an accelerometer and/or a gyroscope, that determines the direction of the gravity vector acting upon the device. Additionally, the apparatus may include or be in communication with, such as via the communication interface, an altimeter or other type of altitude sensor configured to determine the altitude of the device upon capturing the image. Alternatively, the altitude of the device may be predefined. For example, in an instance in which the device is a mobile telephone and is carried by a person, the altitude of the device may be predefined to equal the average height at which the person carries the device relative to the ground. Based upon the gravity vector, such as the direction of the gravity vector, and the altitude of the device upon capturing the image, the apparatus, such as a processing circuitry, is configured to determine the ground plane in the local coordinate frame of the device. The ground plane represents the ground in the local coordinate frame of the device The gravity vector may be considered to be perpendicular to the ground plane, thereby defining the orientation of the ground plane. In this regard, the gravity vector may be considered to be perpendicular to the ground plane in instances in which no additional information is available as to the inclination of the ground or in which information, such as map data, affirmatively indicates that the ground in proximity to the device is not inclined. However, in an instance in which the ground proximate the device is inclined, the gravity vector is not perpendicular to the ground plane. As such, in some example embodiments in which the physical angle of the ground plane and/or the angle of inclination is known at the location of the device, such as based upon map data, the apparatus 20, such as the processing circuitry 22, may also be configured to determine the ground plane based upon the physical angle of the ground plane in order to more accurately model the ground plane in the local coordinate frame of the device based upon the known inclination of the ground.

As shown in block 42 of FIG. 3, the apparatus 20 also includes means, such as the processing circuitry 22 or the like, for determining a projection of the one or more points or lines from an image plane to the ground plane, both of which are in the local coordinate frame of the device. The apparatus, such as the processing circuitry, may be configured to determine the projection of the one or more points or lines from the image plane to the ground plane in various manners. In one example, however, the apparatus, such as the processing circuitry, is configured to determine the projection based on the camera parameters, such as camera projection matrix and/or the camera distortion coefficients, which may be provided by the camera specification or may be estimated. In this example embodiment, the apparatus, such as the processing circuitry, then defines the projection based on the system of equations defining the projection from the chosen three-dimensional (3D) coordinate frame, such as the local coordinate frame, to the two-dimensional (2D) image plane and equations defining the ground plane in the chosen 3D coordinate frame.

The one or more points or lines may be subjected to various types of projections from the image plane to the ground plane. By way of example but not of limitation, the projection will generally be described hereinafter as a perspective projection. In this regard, a perspective projection is, for example, a projection of points from one plane, such as image plane, to another plane, such as ground plane, through a point that does not belong to any of the planes, such as by not belonging to either the image plane or the ground plane. As such, in a perspective projection from the image plane to the ground plane, the projection may be through the camera center and/or the focal point. By way of another example the projection may be a central projection from image plane to ground plane in which the transition is also through the camera center and/or focal point. By way of example, FIG. 4C depicts a perspective projection 64 of the lines 62 representing the feature, that is, the building, identified in the image from the image plane and shown in FIG. 4B to the ground plane. FIG. 4C therefore represents the walls of the building in the local coordinate frame of the device in the ground plane.

The apparatus 20 includes means, such as the processing circuitry 22, the memory device 24, the communication interface 26 or the like, for obtaining map data, at least for a region surrounding and proximate to the coarse location that has been determined for the device 10 at the time at which the image was captured. See block 44. For example, the map data may be stored by the memory device and accessed by the processing circuitry. Alternatively, the map data may be stored external to the apparatus, such as by a map database, and accessed by the processing circuitry via the communication interface based upon the coarse location of the device and has been determined at the time the image was captured. Although the map data may be provided in various manners including as 3D map data, the map data of an example embodiment may be 2D map data, thereby reducing the quantity of map data that is obtained and making the processing of the map data more efficient. In an instance in which the map data that is initially provided is 3D, the apparatus, such as the processing circuitry, may be configured to convert the map data to 2D such that subsequent processing is more efficient.

The map data is defined in the global coordinate frame. To allow for a comparison of the map data to the projection, such as the perspective projection, as described below, the apparatus 20 of an example embodiment also includes means, such as the processing circuitry 22 or the like, for converting one of the map data or the projection of the one or more points or lines representative of the feature from the image from its respective coordinate frame (that is, the global coordinate frame of the map data or the local coordinate frame of the projection) to a common coordinate frame of the other one of the map data or the projection of the one or more points or lines representative of that feature. See block 46. In this regard, the apparatus, such as the processing circuitry, may be configured to convert one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame as well as based upon the location of the location point at which the map data is compared to the projection as described below. For example, the map data may be converted from the global coordinate frame to the local coordinate frame of the perspective projection with the local coordinate frame thereafter serving as the common coordinate frame for purposes of comparison as described below. Alternatively, the perspective projection of the one or more points or lines representative of the feature may be converted from the local coordinate frame to the global coordinate frame of the map data with the global coordinate frame thereafter serving as the common coordinate frame for purposes of comparison. Still further, both the perspective projection of the one of points or lines representative of the feature and the map data may be converted to a different coordinate frame, that is, a coordinate frame different than both the local coordinate frame and the global coordinate frame, with the different coordinate frame thereafter serving as the common coordinate frame for purposes of comparison.

Relative to the coarse location of the device 10, a plurality of location points are defined proximate to and at least partially surrounding the coarse location of the device. The location points may be defined in any of a variety of manners. In an example embodiment, however, the apparatus 20, such as the processing circuitry 22, is configured to define a grid of location points with the coarse location of the device being disposed in a central portion of the grid of location points. In this example embodiment, the grid of location points may define an equal spacing of the location points about the coarse location of the device. Various spacings between the location points may be defined depending upon the granularity with which the refined location of the device is to be determined.

The apparatus 20 includes means, such as the processing circuitry 22 or the like, for comparing, at a respective location point that has been defined relative to the coarse location of the device 10, the map data to the projection of the one or more points or lines representative of the feature identified in the image. See block 48. To allow for the comparison of the map data to the projection of the one or points or lines identified in the image, the map data and the projection have been converted to a common coordinate frame as described above in relation of block 46. In this regard, the apparatus, such as the processing circuitry, is configured to make the conversion of the map data or the projection of one or more points or lines representative of the feature to the coordinate frame of the other one of the map data or the projection, based upon both the orientation of local coordinate frame of the device in relation to the global coordinate frame as well as the location of the location point at which the map data is compared to the projection. Thus, the conversion to a common coordinate frame is performed at each of the plurality of location points at which the comparison is to be performed as the conversion will produce different results at each location point as the conversion is based in part upon the location of the location point at which the map data is compared to the projection.

The comparison may be performed in various manners. In an example embodiment, however, the apparatus 20, such as the processing circuitry 22, is configured to compare the one or more points or lines of the perspective projection that represents the feature from the image to a 2D model of a feature of the same or similar type, such as the closest feature of the same or similar type, as defined by the map data. For example in which the one or more points or lines of the perspective projection represent a road, the apparatus, such as the processing circuitry, may be configured to make a comparison to a 2D model of one or more closest roads defined by the map data. As another example in which the one or more points or lines of the perspective projection represent a building, the apparatus, such as the processing circuitry, may be configured to make a comparison to a 2D model of one or more closest buildings defined by the map data. As such, the map data of an example embodiment includes information identifying the type of features depicted thereby, such as roads, buildings, etc. In an example embodiment, the apparatus, such as the processing circuitry, is configured to compare the map data to the perspective projection by determining a similarity between the map data and the perspective projection of the one or more points or lines representative of the feature following conversion to the common coordinate frame. The similarity may be determined in various manners, but, in one example embodiment, the apparatus, such as the processing circuitry, is configured to determine the similarity based upon a distance between the one or more points or lines of the perspective projection representative of the feature and one or more points or lines defined by the map data, such as the points or lines that comprise the 2D model of the same or similar type of feature, e.g., the closest feature of the same or similar type, as defined by the map data. The similarity between the map data and the perspective projection is a measure of the likelihood of the device having been at the respective location point when the image was captured.

Following the comparison, the apparatus 20 of an example embodiment includes means, such as processing circuitry 22 or the like, for determining whether all of the location points have been considered for purposes of comparison as shown in block 50. In an instance in which all of the location points have not been considered, the apparatus includes means, such as the processing circuitry or the like, for selecting a location point from among the plurality of location points that have not yet been considered for purposes of comparison and the process of comparing the map data to the projection is then repeated at the newly selected location point. See blocks 48 and 52. As noted above, the conversion of the map data and/or the projection to a common coordinate frame is dependent not only upon the orientation of the local coordinate frame of the device in relation to the global coordinate frame, but also the location of the location point on which the map data is compared to the projection. As such, the conversion of the map data and/or the projection to a common coordinate frame may be performed for each of the location points prior to making any comparison. Alternatively, the conversion to a common coordinate frame may be performed for each location point following the selection of the location point for purposes of comparison.

By way of example, FIG. 4D again illustrates the perspective projection of the building in solid lines. Additionally, the map data in the form of one or more points or lines as defined by the 2D model represented by the map data is depicted as dotted lines 66 when the feature is considered from a first location point and as dashed lines 68 when the feature is considered from a second location point. Based upon the distance, such as the average distance, between the lines of the perspective projection and the lines as defined by the 2D model of the map data, the map data is determined to most closely match the perspective projection when considered from the location point at which the distance is minimized. In the embodiment of FIG. 4D, for example, the map data most closely matches the perspective projection when considered from the second location point as opposed to the first location point since the average distance between the dashed lines of the map data when viewed from the second location point and the perspective projection is less than the average distance between the dotted lines of the map data when viewed from the first location point and the perspective projection. As such, as among the first and the second location points proximate the coarse location of the device, the device is determined to be more likely located at the second location point as opposed to the first location point.

In some example embodiments, the comparison of the projection to the map data may be performed with each of a plurality of scaling factors. In this regard, the 2D model defined by the map data may be scaled, such as by the apparatus 20 and, more particularly, by the processing circuitry 22, by various scaling factors and the resulting scaled 2D model compared to the projection at each of the different scales. As such, the method, apparatus and computer program product of this example embodiment can provide for an accurate comparison even in instances in which the original 2D model has a larger or smaller scale than the projection.

The apparatus 20 also includes means, such as the processing circuitry 22 or the like, for determining a refined location of the device 10 following consideration of all of the location points that are of interest relative to the coarse location of the device. See block 58. As noted above, relative to the example of FIG. 4D, the apparatus, such as the processing circuitry, is configured to determine the refined location as the location point from among the plurality of location points at which the map data and the projection are most similar as determined by a comparison following conversion to a common coordinate frame. Although the similarity may be defined in various manners, the apparatus, such as the processing circuitry of an example embodiment, is configured to determine the refined location to be that location point at which the distance between the one or more points or lines of the projection representative of the feature and the one or more points or lines of the same or similar type of feature as defined by the map data is minimized.

Although the refined location may be determined to coincide with a single location point, that is, the location point at which the projection and the map data are most similar, the apparatus 20, such as the processing circuitry 22, of another example embodiment is configured to determine the refined location based upon contributions of a plurality of location points. For example, the apparatus, such as the processing circuitry, may be configured to determine the refined location based upon a weighted average of the location of a plurality of location points, such as the location points within a predefined distance of the coarse location. In this regard, the location of a plurality of location points may be weighted based upon the similarity of the map data at a respective location point to the projection such that a location at which the map data is more similar is weighted more greatly (and contributes to the refined location more substantially) than a location at which the map data is less similar.

By determining the refined location, a more accurate location for the device 10 is defined in comparison to the coarse location as previously determined based upon, for example, GNSS and/or Wi-Fi signals. As such, the localization of the device is improved and applications that are dependent upon the location of the device may provide improved performance, such as for purposes of mapping, navigation or the like. By way of example, and with reference to FIG. 1, the improved localization of the device based upon refined location of the device that has been determined may include the determination of the side of the street on which the device is located and/or the corner of an intersection on which the device is located. As such, the performance of ride-hailing applications is improved by permitting the ride-share vehicle to arrive at the location of the person carrying the device with more precision, even in urban environments in which the localization of the device may otherwise prove to be challenging.

Additionally, radio map data may be enhanced based upon the improved localization of the device 10 in accordance with an example embodiment. A radio map defines the radio signals anticipated to be received by a device at each of a plurality of different locations may be enhanced based upon the improved localization of the device. For example, the radio map may indicate that the Wi-Fi signals received by the device were anticipated to be received in an instance in which the device is located at the coarse location. Following the determination of the refined location of the device, however, the radio map may be updated such that the radio signals received by the device are associated not with the coarse location, but with the refined location of the device, thereby improving the radio map. Various types of radio maps may be improved in this manner including, for example, Wi-Fi radio maps that define the Wi-Fi signals anticipated to be received by a device at each of a plurality of locations.

Further, as a result of the improved localization, the map data may also be optionally enhanced in some embodiments. In this regard, the apparatus 20, such as the processing circuitry 22, may be configured to analyze the image that has been captured utilizing, for example, a computer vision technique, and to determine various attributes of one or more features from the image. Although any of a variety of attributes may be determined from the image, examples include the determination of the façade of a building, such as brick, stucco, etc., the color of the exterior surface of a building, etc. As a result of the improved localization, the map data corresponding to the one or more features of the same or similar type may be identified with precision and information regarding the attributes of the feature(s) that have been determined from the image may be included in or otherwise associated with the map data corresponding to the feature(s), thereby providing additional detail regarding the one or more features.

Although the apparatus 20, such as the processing circuitry 22, may be configured to determine the refined location in various manners, the apparatus of one example embodiment utilizes a neural network, such as a neural network 28 implemented by the processing circuitry as shown in FIG. 2, in order to improve the localization of the device 10. In this example embodiment and as depicted in blocks 70, 72, 74 and 76 of FIG. 5, an image including one or more features is captured, a coarse location of the device at the time in which the image is captured is determined and the orientation of the local coordinate frame of the device in relation to the global coordinate frame at the time at which the image is captured is determined and one or more features represented by the image are identified, such as by computer vision techniques, as described above in conjunction with blocks 30-36 of FIG. 3. In this example embodiment, the apparatus also includes means, such as the processing circuitry or the like, for utilizing a neural network, such as a neural network implemented by the processing circuitry, to determine one or more image-based vectors from the device to respective features in the image captured by an image capture unit associated with the device. See block 78.

The image-based vectors may be determined in various manners, but in one example embodiment are determined to extend from the location at which the image was captured to a respective feature. The image-based vector may be defined to be the shortest vector that is capable of extending from the location at which the image was captured to the respective feature and, in some embodiments, the image-based vector may be defined to have a predefined orientation, such as a perpendicular orientation, relative to the respective feature. In an instance of which the feature is a building, for example, the orientation of the image-based vector may extend from the location at which the device 10 is located at the time the image was captured to that portion of the building that permits the image-based vector to be oriented perpendicularly to the surface of the building that faces the location of the device at the time in which the image was captured. Alternatively, the image-based vector may be defined to have the shortest length when extending from the location at which the image was captured to the building. In another embodiment in which the object is a road, the image-based vector may be defined to extend from the location at which the device is located at the time the image was captured to the road, such as one edge of the road, and to have a predefined orientation, such as perpendicular orientation, to the edge of the road. Alternatively, the image-based vector may be defined to have the shortest length when extending from the location at which the image was captured to the road, that is, the edge of the road.

As described above in conjunction with block 44 of FIG. 3, map data is obtained. See block 80. As described above, the map data can advantageously be 2D map data so as to define a 2D model. In this example embodiment, the apparatus 20 may also include means, such as the processing circuitry 22 or the like, for converting the one or more image-based vectors from a 3D dimensional representation as defined by the image that has been captured to a corresponding 2D representation. In this example embodiment, the apparatus may be configured to convert the one or more image-based vectors to a 2D representation by including means, such as the processing circuitry or the like, for projecting the one or more image-based vectors onto a ground plane, such as a ground plane defined based upon a gravity vector acting upon the device and an altitude of the device upon capturing the image as described above.

The apparatus 20, such as the processing circuitry 22, also defines a plurality of location points, such as a grid of location points, relative to the coarse location of the device 10, such as proximate to and at least partially surrounding the coarse location of the device. See block 80. At each location point, the apparatus 20 includes means, such as the processing circuitry 22 or the like, for determining one or more map-based vectors extending from the respective location point to respective features as defined by the map data. As described above with respect to the image-based vectors, the map-based vectors extend to a respective feature. The map-based vectors may have a predefined orientation, such as a perpendicular orientation, relative to the respective feature, such as a building, a road or the like, or the map-based vectors may be defined to have the shortest length to the respective feature. The map-based vectors may be determined so as to extend to one or more of the closest features of the same or similar type, e.g., road, building, etc., as the feature to which the image-based vector extends. As such, the map data of an example embodiment also includes information identifying the type of the features represented thereby.

As the map data is defined in the global coordinate frame and the image-based vector(s) are defined in the local coordinate frame, the apparatus 10 of an example embodiment includes means, such as the processing circuitry 22 or the like, for converting at least one of (i) the map data or the one or more map-based vectors or (ii) the one or more image-based vectors from its respective coordinate frame to a common coordinate frame of the other one of: (i) the map data or the one or more map-based vectors or (ii) the one or more image-based vectors. See block 82. In regard to converting the map data or the one or more map-based vectors, the map data may be converted if the conversion is performed prior to the determination of one or more map-based vectors. If the map data is converted prior to the determining the one or more map-based vectors, the subsequent determination of the map-based vectors will determine the map-based vectors in the common coordinate frame, such as the local coordinate frame. However, if the map-based vectors are determined prior to converting the map data, the map-based vectors may thereafter be converted to the common coordinate frame, such as the local coordinate frame. With respect to the conversion, the apparatus, such as the processing circuitry, of an example embodiment converts at least one of (i) the map data or the one or more map-based vectors or (ii) the one or more image-based vectors based upon the orientation of the local coordinate frame of the device in relation to the global coordinate frame of the map data and also based upon the location of the location point at which the comparison is to be made.

Following the conversion and at a respective location point, the apparatus 20 includes means, such as the processing circuitry 22 or the like, for comparing (a) one or more map-based vectors extending from the respective location point to respective features, such as the closest features of a respective type, as defined by the map data to (b) one or more image-based vectors that extend to a feature of the respective type. See block 84. The comparison of the map-based vectors and the image-based vectors may be performed in various manners. In an example embodiment, however, the apparatus includes means, such as the processing circuitry or the like, for determining the similarity between each of the one or more map-based vectors and the one or more image-based vectors following conversion to the common coordinate frame. The similarity between each of the map-based vector(s) and the image-based vector(s) may be defined in various manners including by the distance between the vectors. By way of example, FIGS. 6A and 6B depict an image-based vector in solid lines that extends from the location of the device at the time the image was captured to a respective feature, such as to a corner of a building. Map-based vectors from two different location points in the vicinity of the coarse location of the device are depicted in dashed lines in FIGS. 6A and 6B to the closest feature of the same or similar type, such as a corner of the closest building as defined by the map data when viewed from the respective location point. The distances $d_1$ and $d_2$ between the map-based vectors of FIGS. 6A and 6B and the image-based vector are also depicted. Regardless of the manner in which the similarity between the vectors is defined, the similarity is a measure of the likelihood of the device having been at the respective location point when the image was captured.

Following the comparison, the apparatus 20 of an example embodiment includes means, such as processing circuitry 22 or the like, for determining whether all of the location points have been considered for purposes of comparison as shown in block 86. In an instance in which all of the location points have not been considered, the apparatus includes means, such as the processing circuitry or the like, for selecting a location point from among the plurality of location points that have not yet been considered for purposes of comparison and the process of comparing the map-based vector to the image-based vector is then repeated at the newly selected location point. See blocks 84 and 88. As noted above, the conversion of the map data, the map-based vector(s) and/or the image-based vector to a common coordinate frame is dependent not only upon the orientation of the local coordinate frame of the device 10 to the global coordinate frame, but also the location of the location point on which the map-based vector is compared to the image-based vector. As such, the conversion of the map data, the map-based vector(s) and/or the image-based vector to a common coordinate frame may be performed for each of the location points prior to making any comparison. Alternatively, the conversion to a common coordinate frame may be performed for each location point following the selection of the location point for purposes of comparison.

The apparatus 20 also includes means, such as the processing circuitry 22 or the like, for determining a refined location of the device 10 following consideration of all of the location points that are of interest relative to the coarse location of the device. See block 90. As noted above, the apparatus, such as the processing circuitry, is configured to determine the refined location as the location point from among the plurality of location points at which the map-based vector and the image-based vector are most similar as determined by a comparison following conversion to a common coordinate frame. Although the similarity may be defined in various manners, the apparatus, such as the processing circuitry of an example embodiment, is configured to determine the refined location to be that location point at which the distance between a map-based vector and an image-based vector is minimized, such as in the manner in which the distance $d_2$ of FIG. 6B is less than distance $d_1$ of FIG. 6A.

As described above, based upon the determination of a refined location, the localization of the device 10 may be improved. Thus, applications, such as ride-hailing applications, mapping or navigation applications including indoor navigation applications or the like, that are dependent upon the location of the device may offer improved performance. Additionally, or alternatively, radio maps can be enhanced based upon the improved localization determined for the device such as in a manner described above.

As described above in relation to FIG. 5, the apparatus 20 utilizes a neural network 28 in order to determine one or more image-based vectors. As such, the neural network is advantageously trained to identify the one or more image-based vectors. Although the neural network may be trained in various manners, the neural network of an example embodiment is trained to determine an image-based vector extending from the device 10 to a feature in an image that has been captured, such as by the device. In order to train the neural network, the apparatus 20 of an example embodiment includes means, such as the processing circuitry 22, the memory 24, the communication and interface 26 or the like, for providing a training dataset including a set of labelled images. See block 100 of FIG. 7. The training dataset may be stored by the memory device and accessed by the processing circuitry. Alternatively, the training dataset may be provided by a user or from an external database via the communication interface.

The training dataset that is provided may have been generated in various manners including by manually generating the data elements of the training dataset. In an example embodiment, however, the apparatus 20 of an example embodiment includes means, such as the processing circuitry 22 or the like, for generating the training dataset in an automated manner. In this example embodiment, the apparatus that generates the training set includes means, such as the processing circuitry, the communications interface 26 or the like, for receiving a first image and information identifying the location from which the first image was captured and information identifying the orientation of the image capture unit, such as the camera, that captured the first image. In this example embodiment, the apparatus also includes means, such as the processing circuitry and the like, for determining the first vector from the location from which the first image was captured to a first feature, such as corner of a building, in the first image according to map data associated with the location, such as according to a geometric model of the feature as defined by the map data, and also based on the orientation of the camera that captured the first image. In this regard, only the vectors to the features in the view, e.g., in front of the camera should be considered as candidates to be the first vector, and not vectors to the features that are outside of the camera view. The apparatus in an example embodiment also includes means, such as processing circuitry of the like, for defining the class of the first feature based upon the designation of the feature in the map data. For example, the map data may identify the feature as a building such that the class of the first feature may be correspondingly defined as a building. As such, a first data element of the training dataset is defined so as to include the first image, the first vector and the designation of the class of the first feature. Although this automated process may be separately repeated for a plurality of different images so as to define data elements based upon the additional images, the apparatus of an example embodiment also includes means, such as processing circuitry or the like, for generating a plurality of data elements for the first image and associated with different features in the first image. As such, a number of data elements may be generated from one or a smaller number of images.

Each data element of the training dataset includes an image. Although the image may be captured by a camera or other image capture unit, the apparatus 20 of another example embodiment is configured to virtually generate the image. In this regard, the apparatus includes means, such as a processing circuitry 22 or the like, for generating the image by projecting a virtual 3D model of an environment, such as an urban environment. onto a virtual camera plane of a camera that is virtually positioned with an orientation at a location from which the predefined vector extends. By differently positioning the camera within the virtual 3D model of the environment, a plurality of different data elements may be generated. As such, a data training set including a plurality of data elements may be efficiently generated so as to train the neural network 28 in order to accurately determine an image-based vector.

Regardless of the manner in which the training dataset is generated and provided, the training data setting includes a plurality of data elements. Each data element includes an image, a predefined vector to a feature in the image and a designation of the predefined class of the feature. With respect to the predefined vector, the predefined vector may be defined so as to extend from the location at which the image is captured to the feature and to have a predefined relationship or orientation to the feature such as by being perpendicular to the feature and/or by defining the shortest distance from the location to the feature. The predefined class of the feature may be designated in various manners depending upon the type of feature. Typically, the designation of the predefined class of the feature defines the object represented by the feature such as a building, a road or the like.

For one or more data elements of the training dataset, the apparatus 20 of this example embodiment includes means, such as the neural network 28, the processing circuitry 22 embodying the neural network or the like, for determining the image-based vector to the feature in the image and the class of the feature in the image of the respective element. See block 102. In this regard, the neural network is configured to determine an image-based vector to the closest feature of the same or similar type as the feature to which the predefined vector extends in the same image represented by the respective training dataset.

As shown in block 104 of FIG. 7, the apparatus 20 of this example embodiment also includes means, such as the processing circuitry 22 or the like, for comparing the predefined vector to the feature in the image of the respective training dataset to the image-based vector that has been determined by the neural network 28 to extend to the closest feature of the same or similar type in the image of the respective data element. The comparison of the predefined vector to the image-based vector determined by the neural network may be performed in various manners including, for example, based upon a comparison of the difference, such as the distance, between the predefined vector and the image-based vector determined by the neural network. The apparatus, such as the processing circuitry, of an example embodiment may additionally be configured to compare the predefined class of the respective data element to the class of the feature determined by the neural network. As shown in block 106 of FIG. 7, the apparatus of this example embodiment also includes means, such as the processing circuitry, the neural network or the like, for modifying the neural network based upon the comparison of the predefined vector of a respective data element to the image-based vector determined by the neural network and also based upon a comparison of the predefined class of the respective data element and the class of the feature determined by the neural network. In this regard, the neural network may be modified in such a manner that the neural network, as modified, will thereafter determine the image-based vector to more closely represent the predefined vector of the respective data element and to more accurately define the class of the feature.

As described above, FIGS. 3, 5 and 7 are flowcharts of an apparatus 20, method, and computer program product configured to improving the localization of a device 10, such as a mobile device, according to an example embodiment. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as indicated by the dashed outline of certain blocks of FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for improving localization of a device, the method comprising:
   determining, with processing circuitry, a coarse location of the device;
   identifying a feature in an image captured by an image capture unit associated with the device;
   representing the feature with one or more points or lines within an image plane;
   determining a projection of the one or more points or lines from the image plane to a ground plane;
   at one or more location points defined relative to the coarse location of the device, comparing map data to the projection of the one or more points or lines representative of the feature identified in the image;
   determining an orientation of a local coordinate frame of the device in relation to a global coordinate frame upon capturing the image; and
   based on the comparing, determining a refined location of the device, wherein the map data is defined in the global coordinate frame, and wherein the method further comprises converting one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature.

2. A method according to claim 1, wherein converting comprises converting one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the projection.

3. A method according to claim 1, wherein comparing comprises determining a similarity between the map data and the projection of the one or more points or lines representative of the feature following conversion to the common coordinate frame.

4. A method according to claim 3, wherein determining the similarity comprises determining the similarity based upon a distance between the one or more points or lines of the projection representative of the feature and one or more points or lines as defined by the map data.

5. A method according to claim 1, wherein the map data that is compared to the projection of the one or more points or lines representative of the feature defines a two-dimensional model.

6. A method according to claim 5, wherein the feature comprises one of a building, an element of the building, a road or an attribute of the road.

7. A method according to claim 6, wherein the two-dimensional model defined by the map data comprises a two-dimensional representation of at least one of the building or the road.

8. A method according to claim 5, wherein comparing comprises comparing the one or more points or lines of the projection that are representative of the feature to the two-dimensional model defined by the map data.

9. A method according to claim 1, further comprising determining the ground plane based upon a gravity vector acting upon the device and an altitude of the device upon capturing the image.

10. A method according to claim 1, wherein determining the refined location comprises determining a side of a street or a street corner on which the device is located.

11. An apparatus configured to improve localization of a device, the apparatus comprising processing circuitry and at least one non-transitory memory including computer program code instructions stored therein, the computer program code instructions configured to, when executed by the processing circuitry, cause the apparatus at least to:
determine a coarse location of the device;
identify a feature in an image captured by an image capture unit associated with the device;
represent the feature with one or more points or lines within an image plane;
determine a projection of the one or more points or lines from the image plane to a ground plane;
at one or more location points defined relative to the coarse location of the device, compare map data to the projection of the one or more points or lines representative of the feature identified in the image;
determine an orientation of a local coordinate frame of the device in relation to a global coordinate frame upon capturing the image; and
based on the comparison of the map data to the projection, determine a refined location of the device, wherein the map data is defined in the global coordinate frame, and wherein the method further comprises converting one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature.

12. An apparatus according to claim 11, wherein the computer program code instructions are configured to, when executed by the processing circuitry, cause the apparatus to convert one of the map data or the projection by converting one of the map data or the projection of the one or more points or lines representative of the feature from its respective coordinate frame to the coordinate frame of the other one of the map data or the projection of the one or more points or lines representative of the feature based upon the orientation of the local coordinate frame of the device in relation to the global coordinate frame and a location of the location point at which the map data is compared to the perspective projection.

13. An apparatus according to claim 11, wherein the computer program code instructions are configured to, when executed by the processing circuitry, cause the apparatus to compare map data to the projection by determining a similarity between the map data and the projection of the one or more points or lines representative of the feature following conversion to the common coordinate frame.

14. An apparatus according to claim 11, wherein the map data that is compared to the projection of the one or more points or lines representative of the feature defines a two-dimensional model.

15. An apparatus according to claim 11, wherein the computer program code instructions are further configured to, when executed by the processing circuitry, cause the apparatus to determine the ground plane based upon a gravity vector acting upon the device and an altitude of the device upon capturing the image.

16. A computer program product configured to improve localization of a device, the computer program product comprising at least one non-transitory computer-readable storage medium having computer-executable program code instructions stored therein, the computer-executable program code instructions comprising program code instructions configured to:
determine a coarse location of the device;
identify a feature in an image captured by an image capture unit associated with the device;
represent the feature with one or more points or lines within an image plane;
determine a projection of the one or more points or lines from the image plane to a ground plane;
at one or more location points defined relative to the coarse location of the device, compare map data to the projection of the one or more points or lines representative of the feature identified in the image;
determine an orientation of a local coordinate frame of the device in relation to a global coordinate frame upon capturing the image; and
based on the comparison of the map data to the projection, determine a refined location of the device, wherein the map data is defined in the global coordinate frame, and wherein the method further comprises converting one of the map data or the projection of the one or more points or lines representative of the feature from its respective coordinate frame to a common coordinate frame of the other one of the map data or the projection of the one or more points or lines representative of the feature, prior to comparing the map data to the projection of the one or more points or lines representative of the feature.

* * * * *